(12) United States Patent
Silva

(10) Patent No.: US 10,389,869 B1
(45) Date of Patent: Aug. 20, 2019

(54) REMOTE BIOMETRIC SENSOR

(71) Applicant: Americo Silva, London (CA)

(72) Inventor: Americo Silva, London (CA)

( * ) Notice: Subject to any disclaimer, the term of this patent is extended or adjusted under 35 U.S.C. 154(b) by 0 days.

(21) Appl. No.: 16/049,924

(22) Filed: Jul. 31, 2018

(51) Int. Cl.
H04M 1/725 (2006.01)
G06K 9/00 (2006.01)
H04M 1/673 (2006.01)

(52) U.S. Cl.
CPC ........ H04M 1/72577 (2013.01); G06K 9/001 (2013.01); G06K 9/00013 (2013.01); G06K 9/00926 (2013.01); H04M 1/72575 (2013.01); H04M 1/673 (2013.01)

(58) Field of Classification Search
CPC ............................ G06K 9/001; G06K 9/00013
See application file for complete search history.

(56) References Cited

U.S. PATENT DOCUMENTS

| D511,114 S | 11/2005 | Feldman | |
|---|---|---|---|
| 8,928,455 B2 | 1/2015 | Idsoe | |
| 9,001,081 B2 | 4/2015 | Pope | |
| 9,122,856 B2 | 9/2015 | Litz | |
| 2002/0060243 A1* | 5/2002 | Janiak | G06Q 20/341 235/382 |
| 2006/0288233 A1 | 12/2006 | Kozlay | |
| 2015/0363629 A1 | 12/2015 | Lee | |
| 2016/0179218 A1* | 6/2016 | Rosenzweig | G06F 3/0346 345/156 |
| 2017/0017964 A1* | 1/2017 | Janefalkar | G06Q 30/016 |
| 2017/0303185 A1* | 10/2017 | Nathan | G08B 21/18 |
| 2018/0096631 A1* | 4/2018 | Alanis | G09B 21/004 |
| 2019/0018588 A1* | 1/2019 | DeBates | G06F 3/04886 |

FOREIGN PATENT DOCUMENTS

WO 2017017661 3/2017

* cited by examiner

Primary Examiner — Jinsong Hu
Assistant Examiner — Farideh Madani
(74) Attorney, Agent, or Firm — Kyle A. Fletcher, Esq.

(57) ABSTRACT

The remote biometric sensor may comprise a biometric sensor coupled to a phone via a cable and an application program running on the phone. The application program may disable selected features of the phone when the biometric sensor is plugged in to prevent use of the disabled features while driving. As non-limiting examples, the application program may disable texting and non-handsfree use of the phone for calls. The application program may enable one or more disabled features if a finger is placed upon the biometric sensor and the fingerprint read by the biometric sensor matches a learned fingerprint that is stored within the biometric sensor or within the application program's data area. The disabled features may remain enabled for as long as the finger is held against the biometric sensor.

15 Claims, 3 Drawing Sheets

REMOTE BIOMETRIC SENSOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of mobile telephones, more specifically, a remote biometric sensor.

SUMMARY OF INVENTION

The remote biometric sensor may comprise a biometric sensor coupled to a phone via a cable and an application program running on the phone. The application program may disable selected features of the phone when the biometric sensor is plugged in to prevent use of the disabled features while driving. As non-limiting examples, the application program may disable texting and non-handsfree use of the phone for calls. The application program may enable one or more disabled features if a finger is placed upon the biometric sensor and the fingerprint read by the biometric sensor matches a learned fingerprint that is stored within the biometric sensor or within the application program's data area. The disabled features may remain enabled for as long as the finger is held against the biometric sensor.

An object of the invention is to disable selected features of a phone while driving.

Another object of the invention is to provide a biometric sensor that can be placed within a vehicle and access, via a cable, by the phone.

A further object of the invention is to learn one or more enabling fingerprints and store then within the biometric sensor or within the phone as application data.

Yet another object of the invention is to enable one or more disable feature of the phone while a fingerprint matching one or the learned fingerprints is present at the biometric reader.

These together with additional objects, features and advantages of the remote biometric sensor will be readily apparent to those of ordinary skill in the art upon reading the following detailed description of the presently preferred, but nonetheless illustrative, embodiments when taken in conjunction with the accompanying drawings.

In this respect, before explaining the current embodiments of the remote biometric sensor in detail, it is to be understood that the remote biometric sensor is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the remote biometric sensor.

It is therefore important that the claims be regarded as including such equivalent construction insofar as they do not depart from the spirit and scope of the remote biometric sensor. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
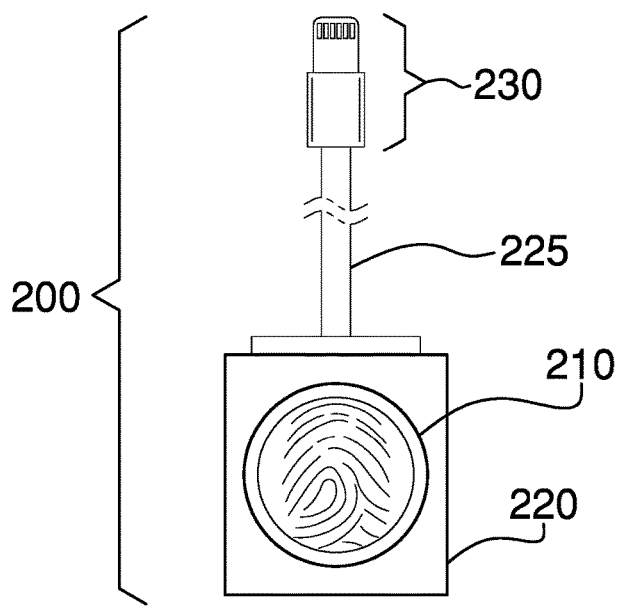
FIG. 1 is a top view of an embodiment of the disclosure illustrating the biometric sensor.
Figure 2:
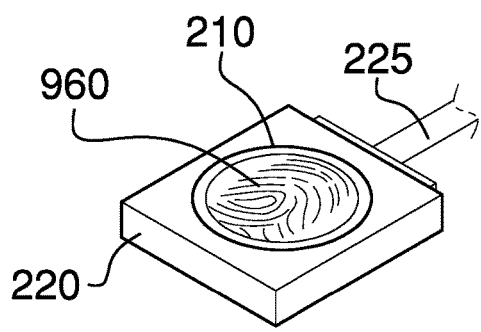
FIG. 2 is a perspective view of an embodiment of the disclosure illustrating the biometric sensor.
Figure 3:
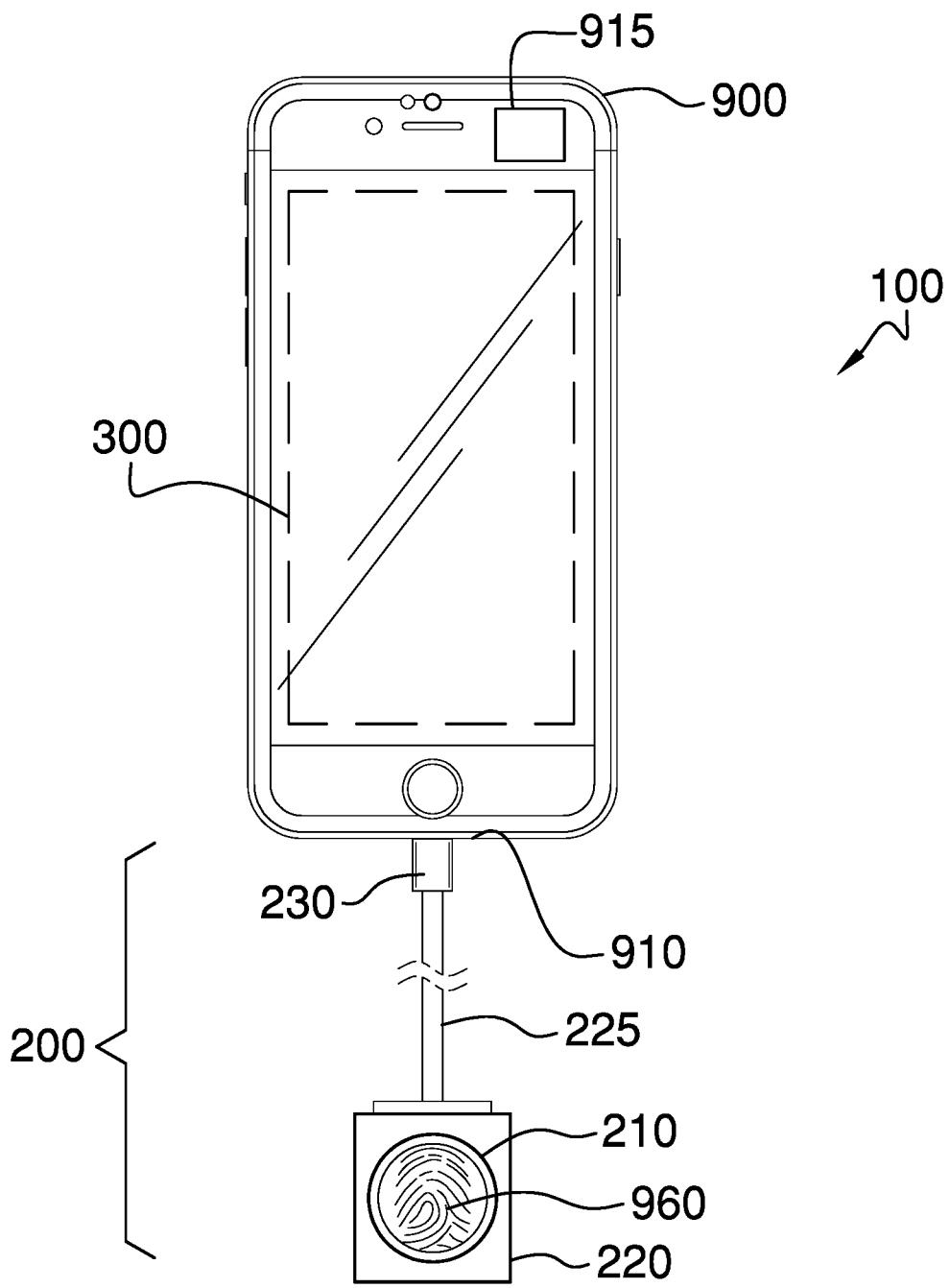
FIG. 3 is a detail view of an embodiment of the disclosure.
Figure 4:
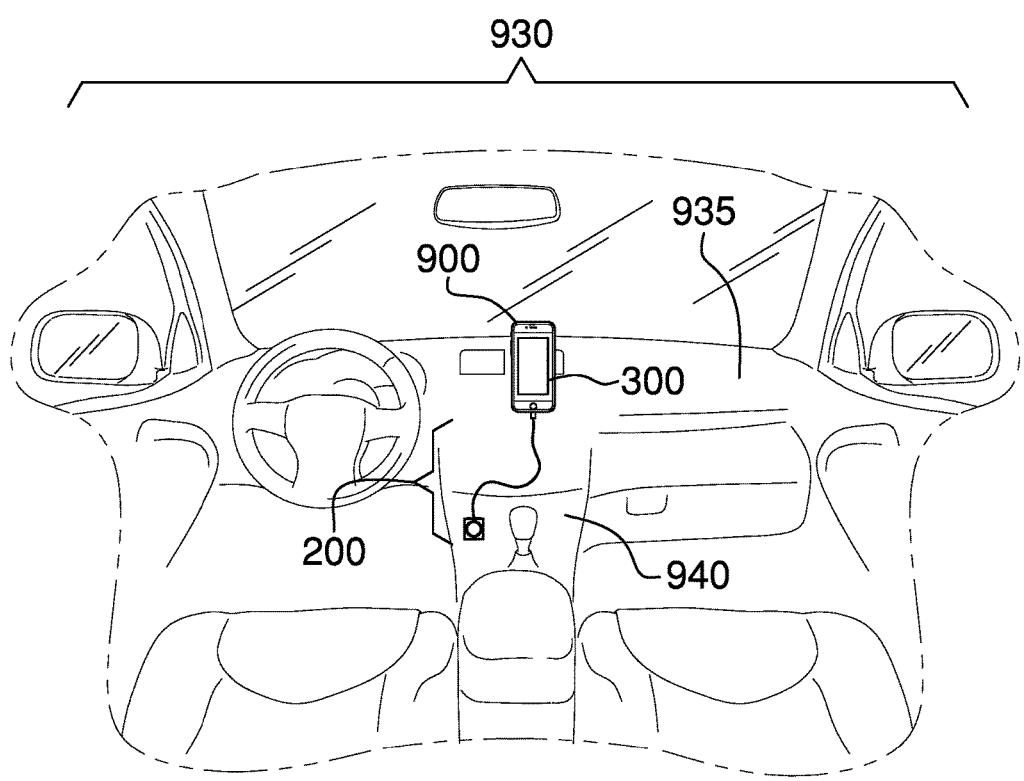
FIG. 4 is an in-use view of an embodiment of the disclosure.

Detailed reference will now be made to a first potential embodiment of the disclosure, which is illustrated in FIGS. 1 through 4.

The remote biometric sensor 100 (hereinafter invention) comprises a biometric sensor 200 and an application program 300. The invention 100 may require an enabling signal from the biometric sensor 200 to be received by the application program 300 on a phone 900 to enable selected features of the phone 900. The biometric sensor 200 may be mounted inside of a vehicle 930 and coupled to the phone 900 via an electrical cable 225. As non-limiting examples, the biometric sensor 200 may be mounted on a dashboard 935 or a center console 940 of the vehicle 930. As non-limiting examples, the invention 100 may prevent texting or non-handsfree use of the phone 900.

The biometric sensor 200 comprises a fingerprint reader 210, an enclosure 220, the electrical cable 225, and a plug 230. The biometric sensor 200 may be adapted to acquire a fingerprint 960 from a finger of a user via the fingerprint reader 210. The biometric sensor 200 may communicate metadata regarding the fingerprint 960 to the phone 900 via the electrical cable 225 and the plug 230.

In some embodiments, the metadata may describe a pattern of the fingerprint 960.

In some embodiments, the metadata may describe a result of a comparison between the fingerprint 960 and one or more previously learned fingerprints that are stored within the biometric sensor 200. The biometric sensor 200 may provide a sensor training mode for learning the one or more previously learned fingerprints. As non-limiting examples, the sensor training mode may be adapted to require a specific interaction with the fingerprint reader 210, such as tapping the fingerprint reader 210 multiples times before placing the finger on the fingerprint reader 210 or completing two consecutive reads with the finger turned 180 degrees between reads.

The fingerprint reader 210 may be adapted to read the fingerprint 960 from the finger. The fingerprint reader 210 may create a digital representation of the fingerprint 960 within the fingerprint reader 210. As a non-limiting example, the digital representation may be a tabular data structure comprising ones and zeros where ones represent the presence of a friction ridge and zeros may indicate absence of a friction ridge, or vice versa.

The enclosure 220 may be a housing for the fingerprint reader 210. The fingerprint reader 210 may be located on the top surface of the enclosure 220 where it is accessible for use. The enclosure 220 may provide a flat rear surface that may be used to mount the biometric sensor 200 to the interior of the vehicle 930. As non-limiting examples, the biometric sensor 200 may be attached to the vehicle 930 using double side tape or hook and loop fasteners.

The electrical cable 225 may exit from a side of the enclosure 220. The distal end of the electrical cable 225 may be coupled to the plug 230. The electrical cable 225 may carry the enabling signal from the biometric sensor 200 to the phone 900. The electrical cable 225 may carry power to operate the biometric sensor 200 from the phone 900 to the biometric sensor 200.

The plug 230 may couple the biometric sensor 200 to the phone 900 via an auxiliary device connector 910 on the phone 900. The plug 230 may transfer the enabling signal and power between the electrical cable 225 and the phone 900. The plug 230 may be complementary to a standard physical interface to the phone 900. As non-limiting example, the plug 230 may be a micro USB connector or a Lightning® connector.

The application program 300 may reside on and may execute on the phone 900. The application program 300 may prevent the use of the selected features of the phone 900 unless the enabling signal is received from the biometric sensor 200. The metadata received from the biometric sensor 200 may be deemed to be the enabling signal if it indicates that the fingerprint 960 matches the one or more previously learned fingerprints that are stored within either the biometric sensor 200 or the phone 900.

In some embodiments, the metadata may represent the pattern of the fingerprint 960 and the application program 300 may compare the fingerprint 960 represented by the metadata with the one or more previously learned fingerprints that are stored on the phone 900. A match found between the fingerprint 960 represented by the metadata and the one or more previously learned fingerprints may be deemed to be the enabling signal and may enable the selected features of the phone 900.

In some embodiments, the metadata may be the result of a comparison between the fingerprint 960 and the one or more previously learned fingerprints that are stored within the biometric sensor 200. The metadata may be deemed to be the enabling signal if the metadata indicates that the match exists.

In some embodiments, the application program 300 may disable itself if the phone 900 is not being used within a moving vehicle, thus allowing normal use of the phone 900. As non-limiting examples, the application program 300 may determine that the phone 900 is being used in a situation that is not a moving vehicle by sensing that the plug 230 has been disconnected or by using a GPS 915 to determine that the vehicle 930 is not moving at highway speeds. The application program 300 may provide an application training mode for learning the one or more previously learned fingerprints. As non-limiting examples, the application training mode may be adapted to require a specific interaction with the application program 300, such as pressing one or more specific on-screen buttons and/or entering a password followed by use of the biometric sensor 200 to read the one or more previously learned fingerprints.

In use, the application program 300 is installed on the phone 900 and the biometric sensor 200 is attached to the dashboard 935 or the center console 940 of the vehicle 930. The plug 230 from the biometric sensor 200 may be inserted into the auxiliary device connector 910 of the phone 900 and the phone 900 may be placed into a holder within the vehicle 930. The application program 300 may disable the selected features of the phone 900 while the plug 230 is connected to the auxiliary device connector 910. As non-limiting examples, the application program 300 may prevent texting or dialing of the phone 900 while the biometric sensor 200 is plugged in. The application program 300 may enable disabled features of the phone 900 if the finger is placed on the fingerprint reader 210 and the fingerprint 960 read from the finger is recognized as being one of the one or more previously learned fingerprints known to the biometric sensor 200 or the application program 300. As a non-limiting example, voice dialing and use of the phone 900 for calls may be enabled as long as the finger is held on the biometric sensor 200.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "application" or "app" is software that is specifically designed for use with a personal computing device.

As used in this disclosure, a "cable" is a collection of insulated wires covered by a protective casing that is used for transmitting electricity or telecommunication signals.

As used herein, the words "couple", "couples", "coupled" or "coupling", refer to connecting, either directly or indirectly, and does not necessarily imply a mechanical connection.

As used herein, the words "data" and "information" are used interchangeably to refer to raw, unprocessed facts and to facts that have been processed, structured, organized, or presented in a context that makes the facts useful.

As used in this disclosure, the terms "distal" and "proximal" may be used to describe relative positions. Distal refers to the object, or the end of an object, that is situated away from the point of origin, point of reference, or point of attachment. Proximal refers to the object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point or a central axis of an object and the direction of comparison may be in a radial or lateral direction.

As used herein, a "fingerprint scanner" or "fingerprint reader" is a biometric device that obtains a fingerprint from a finger placed on the device and encodes the fingerprint into a dataset representing the fingerprint. The device may transmit the dataset representing the fingerprint to another device, may compare the dataset representing the fingerprint with one or more stored datasets representing fingerprints and report any match, or both.

As used herein, "front" indicates the side of an object that is closest to a forward direction of travel under normal use of the object or the side or part of an object that normally presents itself to view or that is normally used first. "Rear" or "back" refers to the side that is opposite the front.

As used herein, "GPS" refers to a device that uses signals received from a system of navigational satellites to determine the position of the device. GPS is an acronym for Global Positioning System.

As used in this disclosure, a "hook and loop fastener" is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface.

As used in this disclosure, a "housing" is a rigid casing that encloses and protects one or more devices.

As used in this disclosure, an "interface" is a physical or virtual boundary that separates two different systems and across which information is exchanged.

As used in this disclosure, the word "interior" is used as a relational term that implies that an object is located or contained within the boundary of a structure or a space.

As used in this disclosure, a "plug" is an electrical termination that electrically connects a first electrical circuit to a second electrical circuit or a source of electricity.

As used in this disclosure, a "sensor" is a device that quantitatively measures a physical stimulus.

As used in this disclosure, "tape" refers to a flexible and narrow strip of textile or sheeting that fastens, secures, augments, decorates, or strengthens an object. Tape may coated with an adhesive on one or both sides.

As used in this disclosure, "USB" is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors.

As used in this disclosure, a "vehicle" is a device that is used for transporting passengers, goods, or equipment.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A remote biometric sensor comprising:
a biometric sensor and an application program;
wherein the remote biometric sensor requires an enabling signal from the biometric sensor to be received by the application program on a phone to enable selected features of the phone;
wherein the biometric sensor is mounted inside of a vehicle on a dashboard or a center console of the vehicle and coupled to the phone via an electrical cable;
wherein the biometric sensor comprises a fingerprint reader, an enclosure, the electrical cable, and a plug;
wherein the biometric sensor is adapted to acquire a fingerprint from a finger of a user via the fingerprint reader;
wherein the biometric sensor communicates metadata regarding the fingerprint to the phone via the electrical cable and the plug;
wherein the fingerprint reader is adapted to read the fingerprint from the finger;
wherein the fingerprint reader creates a digital representation of the fingerprint within the fingerprint reader;
wherein the digital representation is a tabular data structure comprising ones and zeros where ones represent the presence of a friction ridge and zeros indicate absence of a friction ridge, or vice versa.

2. The remote biometric sensor according to claim 1 wherein the metadata describes a pattern of the fingerprint.

3. The remote biometric sensor according to claim 1
wherein the metadata describes a result of a comparison between the fingerprint and one or more previously learned fingerprints that are stored within the biometric sensor.

4. The remote biometric sensor according to claim 1
wherein the biometric sensor provides a sensor training mode for learning the one or more previously learned fingerprints;
wherein the sensor training mode is adapted to require a specific interaction with the fingerprint reader, such as tapping the fingerprint reader multiples times before placing the finger on the fingerprint reader or completing two consecutive reads with the finger turned 180 degrees between reads.

5. The remote biometric sensor according to claim 1
wherein the enclosure is a housing for the fingerprint reader;
wherein the fingerprint reader is located on the top surface of the enclosure where it is accessible for use;
wherein the enclosure provides a flat rear surface that is used to mount the biometric sensor to the interior of the vehicle.

6. The remote biometric sensor according to claim 5 wherein the biometric sensor is attached to the vehicle using double side tape or hook and loop fasteners.

7. The remote biometric sensor according to claim 5 wherein the electrical cable exits from a side of the enclosure;
wherein a distal end of the electrical cable is coupled to the plug.

8. The remote biometric sensor according to claim 7 wherein the electrical cable carries the enabling signal from the biometric sensor to the phone;
wherein the electrical cable carries power to operate the biometric sensor from the phone to the biometric sensor.

9. The remote biometric sensor according to claim 8 wherein the plug couples the biometric sensor to the phone via an auxiliary device connector on the phone;
wherein the plug transfers the enabling signal and power between the electrical cable and the phone;
wherein the plug is complementary to a standard physical interface to the phone.

10. The remote biometric sensor according to claim 9 wherein the application program resides on and executes on the phone;
wherein the application program prevents the use of the selected features of the phone unless the enabling signal is received from the biometric sensor;
wherein the metadata received from the biometric sensor is deemed to be the enabling signal if it indicates that the fingerprint matches the one or more previously learned fingerprints that are stored within either the biometric sensor or the phone.

11. The remote biometric sensor according to claim 10 wherein the metadata represents the pattern of the fingerprint and the application program compares the fingerprint represented by the metadata with the one or more previously learned fingerprints that are stored on the phone;
wherein a match found between the fingerprint represented by the metadata and the one or more previously learned fingerprints are deemed to be the enabling signal and enable the selected features of the phone.

12. The remote biometric sensor according to claim 10 wherein the metadata is the result of a comparison between the fingerprint and the one or more previously learned fingerprints that are stored within the biometric sensor;
wherein the metadata is deemed to be the enabling signal if the metadata indicates that the match exists.

13. The remote biometric sensor according to claim 10 wherein the application program disables itself if the phone is not being used within a moving vehicle, thus allowing normal use of the phone.

14. The remote biometric sensor according to claim 10 wherein the application program provides an application training mode for learning the one or more previously learned fingerprints.

15. The remote biometric sensor according to claim 14 wherein the application training mode is adapted to require a specific interaction with the application program, such as pressing one or more specific on-screen buttons and/or entering a password followed by use of the biometric sensor to read the one or more previously learned fingerprints.

* * * * *